US012654126B2

(12) United States Patent
O'Brien

(10) Patent No.: US 12,654,126 B2
(45) Date of Patent: Jun. 16, 2026

(54) 4-STAGE MEMBRANE PROCESS WITH SWEEP FOR BIOGAS UPGRADING

(71) Applicant: Air Products and Chemicals, Inc., Allentown, PA (US)

(72) Inventor: Matthew P. O'Brien, House Springs, MO (US)

( * ) Notice: Subject to any disclaimer, the term of this patent is extended or adjusted under 35 U.S.C. 154(b) by 338 days.

(21) Appl. No.: 18/413,323

(22) Filed: Jan. 16, 2024

(65) Prior Publication Data

US 2025/0229220 A1     Jul. 17, 2025

(51) Int. Cl.
*B01D 53/22* (2006.01)

(52) U.S. Cl.
CPC ......... *B01D 53/226* (2013.01); *B01D 53/227* (2013.01); *B01D 2256/245* (2013.01); *B01D 2257/504* (2013.01); *B01D 2258/05* (2013.01); *B01D 2311/13* (2013.01); *B01D 2311/14* (2013.01); *B01D 2311/2512* (2022.08); *B01D 2313/24* (2013.01); *B01D 2315/10* (2013.01); *B01D 2317/025* (2013.01); *B01D 2317/04* (2013.01); *B01D 2317/08* (2013.01)

(58) Field of Classification Search
CPC ......... C10L 3/104; C10K 1/005; B01D 53/22; B01D 53/225; B01D 53/226; B01D 53/227; B01D 2256/245; B01D 2257/504; B01D 2317/02; B01D 2317/022; B01D 2317/025; B01D 2317/04; B01D 2311/13; B01D 2311/25; B01D 2311/251; B01D 2311/2513; B01D 2311/252; B01D 2311/2521; B01D 2311/2523; B01D 2311/2512
See application file for complete search history.

(56) References Cited

U.S. PATENT DOCUMENTS

| | | | | | |
|---|---|---|---|---|---|
| 5,064,446 | A | * | 11/1991 | Kusuki | ................... C01B 3/501 |
| | | | | | 95/55 |
| 5,169,412 | A | * | 12/1992 | Prasad | ................. B01D 53/226 |
| | | | | | 95/52 |
| 5,281,253 | A | * | 1/1994 | Thompson | ............. B01D 61/12 |
| | | | | | 96/9 |
| 5,282,969 | A | * | 2/1994 | Xu | ........................ B01D 53/226 |
| | | | | | 210/640 |
| 5,306,427 | A | * | 4/1994 | Xu | .......................... B01D 53/22 |
| | | | | | 210/640 |
| 5,314,528 | A | * | 5/1994 | Monereau | ............... C01B 3/501 |
| | | | | | 95/55 |
| 5,378,263 | A | * | 1/1995 | Prasad | ................. B01D 53/226 |
| | | | | | 96/9 |
| 6,565,626 | B1 | * | 5/2003 | Baker | ..................... C10L 3/103 |
| | | | | | 95/52 |
| 6,630,011 | B1 | * | 10/2003 | Baker | ................... B01D 53/225 |
| | | | | | 95/47 |

(Continued)

FOREIGN PATENT DOCUMENTS

WO          2022012944          1/2022

*Primary Examiner* — Duane Smith

(74) *Attorney, Agent, or Firm* — Amy Carr-Trexler

(57) ABSTRACT

Disclosed herein are membrane-based gas separation methods and systems. The methods and systems may, in particular, be used for separating a feed stream comprising methane and carbon dioxide (such as for example a biogas feed stream) in order to provide a methane product stream (such as for example a biomethane stream).

20 Claims, 1 Drawing Sheet

(56) References Cited

U.S. PATENT DOCUMENTS

| | | | | |
|---|---|---|---|---|
| 8,999,038 | B2 * | 4/2015 | Ungerank | B01D 53/225 |
| | | | | 95/47 |
| 10,047,310 | B2 * | 8/2018 | Kim | C10L 3/104 |
| 11,285,434 | B2 * | 3/2022 | Henry | B01D 53/226 |
| 11,731,076 | B1 * | 8/2023 | O'Brien | B01D 53/229 |
| | | | | 585/818 |
| 11,786,862 | B2 * | 10/2023 | Capra | C07C 7/144 |
| | | | | 95/51 |
| 11,980,846 | B1 * | 5/2024 | Bikson | B01D 53/227 |
| 12,017,180 | B2 * | 6/2024 | Vaidya | B01D 71/24 |
| 12,139,681 | B1 * | 11/2024 | Bikson | B01D 53/226 |
| 12,139,682 | B1 * | 11/2024 | Bikson | B01D 53/225 |
| 12,264,288 | B1 * | 4/2025 | Bikson | C10L 3/103 |
| 12,281,273 | B1 * | 4/2025 | Bikson | B01D 53/229 |
| 12,378,491 | B1 * | 8/2025 | Bikson | B01D 53/002 |
| 12,454,654 | B1 * | 10/2025 | Bikson | C10L 3/106 |
| 2008/0302013 | A1 * | 12/2008 | Repasky | B01J 12/007 |
| | | | | 48/198.1 |
| 2010/0275777 | A1 * | 11/2010 | Hasse | B01D 53/226 |
| | | | | 96/9 |
| 2011/0240924 | A1 * | 10/2011 | Repasky | C01B 3/38 |
| | | | | 252/373 |
| 2011/0305310 | A1 * | 12/2011 | Sanchez | B01D 53/227 |
| | | | | 95/55 |
| 2012/0111052 | A1 * | 5/2012 | Szivacz | C10L 3/10 |
| | | | | 62/619 |
| 2013/0098242 | A1 * | 4/2013 | Ungerank | B01D 53/227 |
| | | | | 96/10 |
| 2016/0229771 | A1 * | 8/2016 | Paget | B01D 53/226 |
| 2016/0288047 | A1 * | 10/2016 | Fukuda | B01D 53/22 |
| 2016/0346727 | A1 * | 12/2016 | Yeo | B01D 53/226 |
| 2017/0014753 | A1 * | 1/2017 | Peters | C10L 3/102 |
| 2017/0050900 | A1 * | 2/2017 | Su | B01D 53/229 |
| 2017/0198227 | A1 * | 7/2017 | Kim | B01D 53/226 |
| 2017/0283292 | A1 * | 10/2017 | Kim | B01D 53/226 |
| 2018/0133644 | A1 * | 5/2018 | Liu | C08J 7/0427 |
| 2018/0223205 | A1 * | 8/2018 | Mitariten | C10L 3/104 |
| 2018/0250627 | A1 * | 9/2018 | Zick | B01D 53/226 |
| 2018/0283777 | A1 * | 10/2018 | Matsubara | C10L 3/101 |
| 2018/0283778 | A1 * | 10/2018 | Eda | B01D 53/226 |
| 2019/0030482 | A1 * | 1/2019 | Ding | B01D 71/5211 |
| 2019/0193021 | A1 * | 6/2019 | Rekoske | B01D 53/227 |
| 2019/0224617 | A1 * | 7/2019 | Mitariten | B01D 71/76 |
| 2019/0321780 | A1 * | 10/2019 | Bikson | B01D 53/0407 |
| 2019/0367820 | A1 * | 12/2019 | McCool | B01D 61/362 |
| 2020/0047112 | A1 * | 2/2020 | Chareyre | B01D 53/30 |
| 2020/0254383 | A1 * | 8/2020 | Roodbeen | B01D 53/227 |
| 2021/0236986 | A1 * | 8/2021 | Thierry | C10L 3/104 |
| 2021/0299605 | A1 * | 9/2021 | Henry | C10L 3/101 |
| 2022/0062815 | A1 * | 3/2022 | Kim | B01D 71/0221 |
| 2022/0134274 | A1 * | 5/2022 | Pedersen | B01D 53/30 |
| | | | | 585/818 |
| 2022/0134284 | A1 * | 5/2022 | Baker | B01D 61/368 |
| | | | | 210/321.6 |
| 2022/0184549 | A1 * | 6/2022 | Nakamura | B01D 69/08 |
| 2022/0203293 | A1 * | 6/2022 | Myrick | B01D 53/226 |
| 2022/0203294 | A1 * | 6/2022 | Myrick | B01D 53/228 |
| 2022/0203295 | A1 * | 6/2022 | Myrick | B01D 53/225 |
| 2023/0001349 | A1 * | 1/2023 | Vaidya | B01D 71/32 |
| 2023/0108642 | A1 * | 4/2023 | Kinoshita | B01D 71/02 |
| | | | | 96/9 |
| 2023/0114525 | A1 * | 4/2023 | Henry | B01D 53/228 |
| | | | | 96/9 |
| 2023/0135721 | A1 * | 5/2023 | Ding | F25J 3/061 |
| | | | | 95/50 |
| 2023/0192486 | A1 * | 6/2023 | Franke | C01B 3/501 |
| | | | | 95/55 |
| 2023/0271130 | A1 * | 8/2023 | Priske | B01D 53/227 |
| | | | | 96/7 |
| 2023/0294039 | A1 * | 9/2023 | Ihara | B01D 53/226 |
| 2024/0115988 | A1 * | 4/2024 | Maeng | B01D 53/228 |
| 2024/0131469 | A1 * | 4/2024 | Foody | B01D 53/22 |
| 2024/0352366 | A1 * | 10/2024 | Loeb | C10L 3/08 |
| 2024/0424453 | A1 * | 12/2024 | Ding | B01D 53/225 |
| 2025/0035376 | A1 * | 1/2025 | Valentin | F25J 3/0233 |
| 2025/0066272 | A1 * | 2/2025 | O'Brien | C07C 7/144 |
| 2025/0136884 | A1 * | 5/2025 | O'Brien | B01D 53/226 |
| 2025/0223246 | A1 * | 7/2025 | Fukuda | C07C 7/144 |
| 2025/0229220 | A1 * | 7/2025 | O'Brien | B01D 53/227 |
| 2025/0276275 | A1 * | 9/2025 | Terrien | B01D 53/227 |
| 2025/0345742 | A1 * | 11/2025 | Ha | F25J 3/0266 |
| 2025/0367596 | A1 * | 12/2025 | Roodbeen | B01D 53/225 |
| 2026/0008003 | A1 * | 1/2026 | Furue | B01D 53/226 |

* cited by examiner

4-STAGE MEMBRANE PROCESS WITH SWEEP FOR BIOGAS UPGRADING

BACKGROUND

The present invention relates to a membrane-based gas separation method and system. In particular, the methods and systems may be used for separating a feed stream comprising methane and carbon dioxide (such as for example a biogas feed stream) in order to provide a methane product stream (such as for example a biomethane stream).

Membrane-based gas separation methods and systems, using a variety of different multistage configurations, have been developed and used in the prior art for upgrading raw biogas streams into high purity methane streams. Arrangements designed for both for high methane recovery and purity are known.

An often-employed prior art arrangement utilizes three membrane stages in order to separate a biogas feed stream, or other methane- and carbon dioxide-containing feed stream, into high purity methane and carbon dioxide product streams. The feed stream is introduced into a first membrane stage (also referred to as the "feed stage") where it is separated into a first retentate stream enriched in methane and a first permeate stream enriched in carbon dioxide. The first retentate stream and first permeate stream are then introduced into, respectively, a second membrane stage (also referred to as the "retentate stage") and the third membrane stage (also referred to as the "permeate stage"). The first retentate stream is separated inside the retentate stage into a second retentate stream and a second permeate stream, the second retentate stream being further enriched in methane and forming the high purity methane (e.g. biomethane) product. The first permeate stream is separated inside the permeate stage into a third retentate stream and a third permeate stream, the third permeate stream being further enriched in carbon dioxide and forming the high purity carbon dioxide product. The second permeate and third retentate streams are recycled into the feed stream to provide for high product recovery.

A difficulty with this prior art three-stage arrangement is that the retentate stage often operates under high $CO_2$ reduction conditions, which can lead to unpredictable performance due to inefficiencies that are inherent in commercial gas separation module design.

WO2022/012944A1 describes a four stage membrane separation method and system for separating a methane- and carbon dioxide-containing feed stream into methane and carbon dioxide product streams. In comparison to the three-stage arrangement described above, the third retentate stream (produced from the third membrane stage) is not recycled into the feed stream but is instead introduced into a fourth membrane stage where it is separated into a fourth retentate stream and a fourth permeate stream. The fourth retentate stream is then recycled to the feed stream (alongside the second permeate stream), while the fourth permeate stream is sent to a methane oxidation unit.

US20220203295A1 and US20160229771A1 each describe four stage membrane separation methods and systems for separating a gas mixture in which the third retentate stream (produced from the third membrane stage) is again not recycled into the feed stream but is instead introduced into a fourth membrane stage where it is separated into a fourth retentate stream and a fourth permeate stream. The fourth permeate stream is taken as a product stream, and the fourth retentate stream is recycled to the feed stream alongside the second permeate stream. In the arrangement described in US20220203295A1 a portion of the retentate gas produced by each membrane stage may be used as a sweep gas in the membrane stage from which it was produced in order to "self-sweep" each stage.

BRIEF SUMMARY

Disclosed herein are membrane-based gas separation methods and systems that utilize four membrane stages for separating a feed stream comprising a first component (e.g. methane) and a second component (e.g. carbon dioxide). The first membrane stage separates the feed stream into a first retentate stream enriched in the first component and a first permeate stream enriched in the second component. The second membrane stage separates the first retentate stream into a second retentate stream and a second permeate stream, the second retentate stream being further enriched in the first component (and that preferably forms a product stream of said component). The third membrane stage separates the first permeate stream into a third retentate stream and a third permeate stream, the third permeate stream being further enriched in the second component (and that preferably forms a product stream of said component). The fourth membrane stage separates the third retentate stream into a fourth retentate stream and fourth permeate stream, with the fourth retentate stream being supplied to the second membrane stage as a sweep gas, and with the fourth permeate stream being recycled into the feed stream along with the second permeate stream.

This arrangement improves the efficiency of the gas separation module(s) of the second membrane stage by sweeping the permeate side of the second membrane stage with a first component (e.g. methane) rich retentate gas that has been generated by the fourth membrane stage by further purifying the retentate stream from the third membrane stage in the fourth membrane stage. Since this method and system generates its own sweep gas, there is no need to import a suitable sweep gas or generate a suitable sweep gas onsite using a separate process, either of which would have adverse cost implications. Unlike the process described in US20220203295A1, there is also no need to utilize part of the second retentate stream itself as a sweep gas, which likewise may otherwise have negative cost implications (such as where said second retentate stream represents a valuable product stream such as a desired methane product).

Several preferred aspects of the systems and methods according to the present invention are outlined below.

Aspect 1: A membrane-based gas separation method, the method comprising:

(a) introducing a feed stream, comprising a first component and a second component, into a first membrane stage comprising a first gas separation membrane that is more permeable to the second component than the first component, the first gas separation membrane separating the feed stream to form a first retentate stream and a first permeate stream that are each withdrawn from the first membrane stage, the first retentate stream being enriched in the first component and the first permeate stream being enriched in the second component;

(b) introducing the first retentate stream into a second membrane stage comprising a second gas separation membrane that is more permeable to the second component than the first component, the second gas separation membrane separating the first retentate stream to form a second retentate stream and a second permeate stream that are each withdrawn from the second membrane stage, the second retentate stream being further enriched in the first component;

(c) introducing the first permeate stream into a third membrane stage comprising a third gas separation membrane that is more permeable to the second component than the first component, the third gas separation membrane separating the first permeate stream to form a third retentate stream and a third permeate stream that are each withdrawn from the third membrane stage, the third permeate stream being further enriched in the second component;

(d) introducing the third retentate stream into a fourth membrane stage comprising a fourth gas separation membrane that is more permeable to the second component than the first component, the fourth gas separation membrane separating the third retentate stream to form a fourth retentate stream and fourth permeate stream that are each withdrawn from the fourth membrane stage;

(e) introducing the fourth retentate stream as a sweep gas into the second membrane stage; and (f) recycling the second permeate stream and the fourth permeate stream into the feed stream.

Aspect 2: The method of Aspect 1, wherein the first component is methane and the second component is carbon dioxide.

Aspect 3: The method of Aspect 1 or 2, wherein the feed stream is a biogas feed stream.

Aspect 4: The method of any one of Aspects 1 to 3, wherein the second retentate stream forms a product stream comprising the first component.

Aspect 5: The method of any one of Aspects 1 to 4, wherein the third permeate stream forms a product stream comprising the second component.

Aspect 6: The method of any one of Aspects 1 to 5, wherein the fourth retentate stream is withdrawn from the fourth membrane stage at a first pressure and is introduced as sweep gas into the second membrane stage at a second pressure that is lower than the first pressure.

Aspect 7: The method of Aspect 6, wherein the fourth retentate stream is reduced in pressure from the first pressure to the second pressure by passing the fourth retentate stream through a pressure control valve that maintains the fourth retentate stream at the first pressure upstream of the valve.

Aspect 8: The method of any one of Aspects 1 to 7, wherein the feed stream is compressed prior to being introduced into the first membrane stage.

Aspect 9: The method of Aspect 8, wherein the second permeate stream is recycled into the feed stream upstream of the compressor or between stages of the compressor, and/or wherein the fourth permeate stream is recycled into the feed stream upstream of the compressor or between stages of the compressor.

Aspect 10: The method of any one of Aspects 1 to 9, wherein the third permeate stream is withdrawn from the third membrane stage at a sub-atmospheric pressure.

Aspect 11: A membrane-based gas separation system, the system comprising:

a first membrane stage for receiving a feed stream comprising a first component and a second component, the first membrane stage comprising a first gas separation membrane that is more permeable to the second component than the first component and that is configured to separate the feed stream to form a first retentate stream and a first permeate stream that are each withdrawn from the first membrane stage with the first retentate stream being enriched in the first component and the first permeate stream being enriched in the second component;

a second membrane stage in fluid flow communication with the first membrane stage for receiving the first retentate stream from the first membrane stage, the second membrane stage comprising a second gas separation membrane that is more permeable to the second component than the first component and that is configured to separate the first retentate stream to form a second retentate stream and a second permeate stream that are each withdrawn from the second membrane stage with the second retentate stream being further enriched in the first component;

a third membrane stage in fluid flow communication with the first membrane stage for receiving the first permeate stream from the first membrane stage, the third membrane stage comprising a third gas separation membrane that is more permeable to the second component than the first component and that is configured to separate the first permeate stream to form a third retentate stream and a third permeate stream that are each withdrawn from the third membrane stage with the third permeate stream being further enriched in the second component;

a fourth membrane stage in fluid flow communication with the third membrane stage for receiving the third retentate stream from the third membrane stage, the fourth membrane stage comprising a fourth gas separation membrane that is more permeable to the second component than the first component and that is configured to separate the third retentate stream to form a fourth retentate stream and fourth permeate stream that are each withdrawn from the fourth membrane stage;

wherein the system is configured such that the fourth membrane stage is also in fluid flow communication with the second membrane stage such that the fourth retentate stream from the fourth membrane stage is introduced as a sweep gas into the second membrane stage; and wherein the system is configured such that the second permeate stream and the fourth permeate stream are recycled into the feed stream.

Aspect 12: The system of Aspect 11, wherein the first component is methane and the second component is carbon dioxide.

Aspect 13: The system of Aspect 11 or 12, wherein the feed stream is a biogas feed stream.

Aspect 14: The system of any one of Aspects 11 to 13, wherein the system is configured such that the second retentate stream is withdrawn from the system as a product stream comprising the first component.

Aspect 15: The system of any one of Aspects 11 to 14, wherein the system is configured such that the third permeate stream is withdrawn from the system as a product stream comprising the second component.

Aspect 16: The system of any one of Aspects 11 to 15, wherein the system is configured such that the fourth retentate stream is withdrawn from the fourth membrane stage at a first pressure and is introduced as sweep gas into the second membrane stage at a second pressure that is lower than the first pressure.

Aspect 17: The system of Aspect 16, wherein the system further comprises a pressure control valve through which the fourth retentate stream is passed and reduced in pressure from the first pressure to the second pressure, the pressure control valve being configured to maintain the fourth retentate stream at the first pressure upstream of the valve.

Aspect 18: The system of any one of Aspects 11 to 17, wherein the system further comprises a compressor configured to compress the feed stream prior to said stream being introduced into the first membrane stage.

Aspect 19: The system of Aspect 18, wherein the system is configured such that the second permeate stream is recycled into the feed stream upstream of the compressor or between stages of the compressor, and/or such that the fourth permeate stream is recycled into the feed stream upstream of the compressor or between stages of the compressor.

Aspect 20: The system of any one of Aspects 11 to 19, wherein the system further comprises a vacuum pump configured to withdraw the third permeate stream from the third membrane stage at a sub-atmospheric pressure.

DETAILED DESCRIPTION

Figure 1:
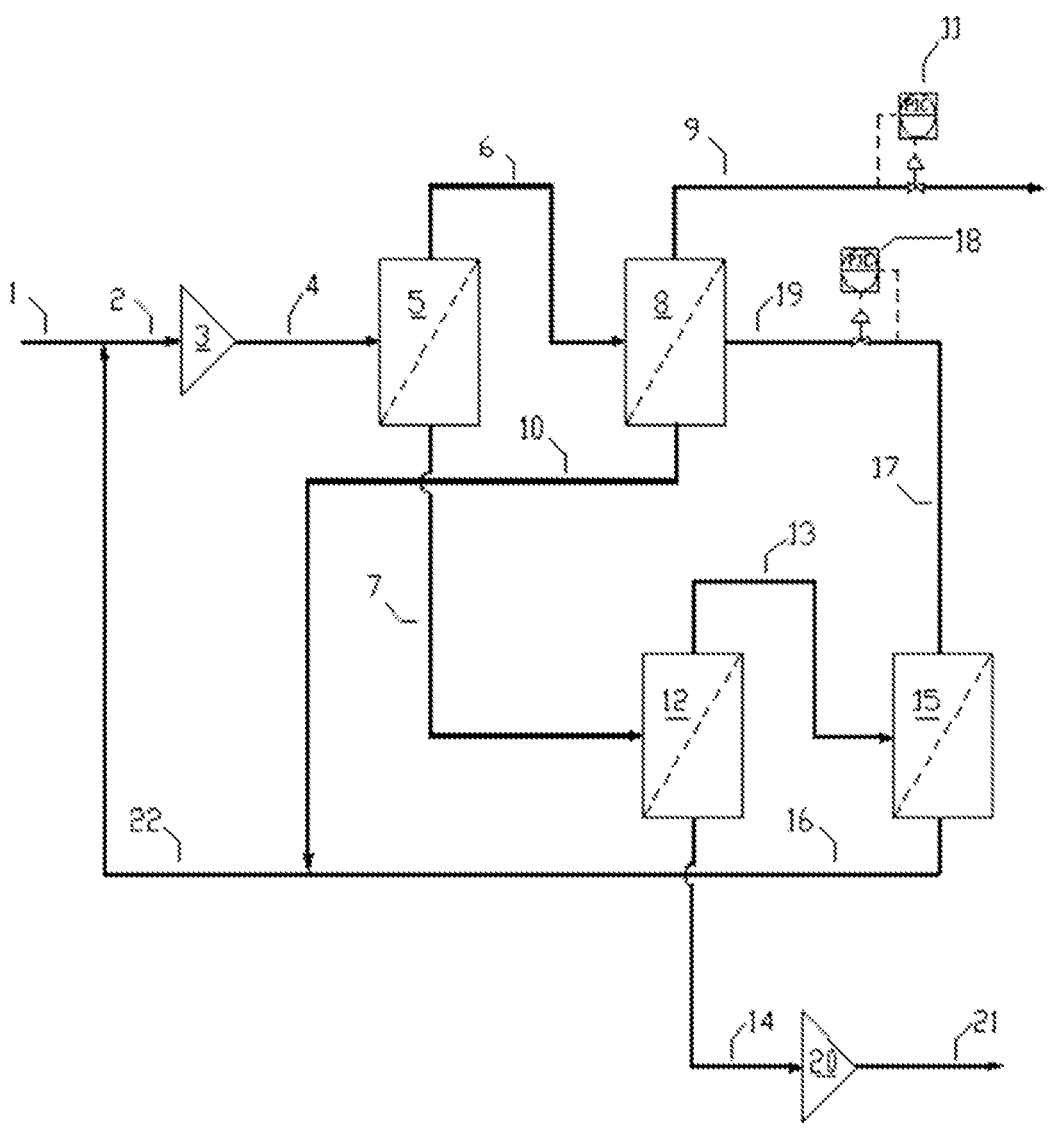
FIG. 1 is a schematic depicting a membrane-based gas separation method and system in accordance with an embodiment of the present invention.

As used herein and unless otherwise indicated, the articles "a" and "an" mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Where letters are used herein to identify recited steps of a method (e.g. (a), (b), and (c)), these letters are used solely to aid in referring to the method steps and are not intended to indicate a specific order in which claimed steps are performed, unless and only to the extent that such order is specifically recited.

Where used herein to identify recited features of a method or system, the terms "first," "second," "third," and so on are used solely to aid in referring to and distinguishing between the features in question, and are not intended to indicate any specific order of the features, unless and only to the extent that such order is specifically recited.

As used herein, reference to a stream from a gas separation step or process being "enriched" in a particular gas or component means that the stream has a higher mole % of said particular gas or component than the stream from which it was separated. Thus, for example, where a feed stream containing methane and carbon dioxide is separated in a first membrane stage into first retentate stream that is enriched in methane and a first permeate stream that is enriched in carbon dioxide, the first retentate stream has a higher mole % of methane than the feed stream and the first permeate stream has a higher mole % of carbon dioxide than the feed stream. Likewise, where said first retentate stream is then separated in a second membrane stage to provide a second retentate stream that is further enriched in methane, said second retentate stream has a mole % of methane that is higher than that of the first retentate stream and that is thus further elevated compared to that of the feed stream.

As used herein, the term "fluid flow communication" refers to the nature of connectivity between two or more components that enables liquids, vapors, and/or two-phase mixtures to be transported between the components in a controlled fashion (i.e., without leakage) either directly or indirectly. Coupling two or more components such that they are in fluid flow communication with each other can involve any suitable method known in the art, such as with the use of welds, flanged conduits, gaskets, and bolts. Two or more components may also be coupled together via other components of the system that may separate them, for example, valves, gates, or other devices that may selectively restrict or direct fluid flow. As used herein, the term "conduit" refers to one or more structures through which fluids can be transported between two or more components of a system. For example, conduits can include pipes, ducts, passageways, and combinations thereof that transport liquids, vapors, and/or gases.

As used herein, the term "gas separation membrane" refers to a (usually thin) barrier that is more permeable to one or more components (i.e. compounds, molecules or atoms) of a gaseous mixture than one or more other components of the gaseous mixture, and that therefore forms a selective barrier for separating said gaseous mixture into a retentate gas enriched in the less permeable component(s) and a permeate gas enriched in the more permeable component(s)—the more permeable component(s) being the component(s) that permeate the membrane more quickly, and the less permeable component(s) being the component(s) that permeate the membrane more slowly. The membrane may be formed of one or more materials of any suitable kind, although often one or more polymeric materials are used, and may take the form of one or more asymmetric or composite hollow fibers, flat sheets, spiral wound sheets, or have any other suitable configuration.

As used herein, the term "gas separation module" refers to a unit suitable for separating a gas mixture into a retentate gas and a permeate gas, said unit comprising a housing (also referred to as a "shell") and a gas separation membrane contained within said housing that divides the housing interior into a feed side and a permeate side. The gas mixture is introduced into the housing interior on the feed side via a feed inlet to the housing. Gas that permeates the gas separation membrane forms the permeate gas (which is enriched in the more permeable component(s) of the gas mixture) that is then withdrawn from the permeate side via a permeate gas outlet to the housing. Conversely, gas that does not permeate the gas separation membrane forms the retentate gas (which is enriched in the less permeable component(s) of the gas mixture) that is withdrawn from the feed side via a retentate gas outlet to the housing. As noted above, the gas separation membrane may be formed of any suitable material(s), and may take any suitable form such as, but not limited to, one or more hollow fibers, flat sheets or spiral wound sheets.

For example, in the case where the gas separation membrane of the gas separation module takes the form of a bundle of hollow fibers, with each of the hollow fibers comprising a bore with open ends and a side wall formed of the membrane material(s), the fibers are typically arranged such that the interiors of the hollow fibers (i.e. the bores of the fibers) form the feed side of the module and a shell space exterior to the hollow fibers and interior to the shell (i.e. the housing) forms the permeate side of the module. Thus, in this arrangement, the gas mixture is introduced, via the feed inlet to the housing, into the fiber bores via one end of the fibers. The gases permeating the side walls of the fibers form the permeate gases that are then withdrawn from the shell space via the permeate gas outlet to the housing; and the gases passing through the fiber bores and exiting the other end of the fibers form the retentate gases that are then withdrawn via the retentate gas outlet to the housing.

As used herein, the term "membrane stage" refers to a device, comprising a gas separation membrane, that is suitable for separating a gas mixture stream into a retentate stream enriched in the less permeable component(s) of the gas mixture stream and a permeate stream enriched in the more permeable component(s) of the gas mixture stream. A membrane stage is comprised of one or more gas separation modules, the gas separation membrane(s) of said gas separation module(s) constituting the gas separation membrane of the membrane stage, the feed side(s) of said gas separation module(s) constituting the feed side of the membrane stage and the permeate side(s) of said gas separation module(s) constituting the permeate side of the membrane stage, the retentate stream produced by the membrane stage being formed from the retentate gases withdrawn from said gas separation module(s) and the permeate stream produced by the membrane stage being formed from the permeate gases withdrawn from said gas separation module(s). Where a membrane stage is comprised of a plurality of (i.e. two or more) gas separation modules, said gas separation modules may (unless otherwise indicated) be arranged in series or in parallel. Where two gas separation modules are arranged in series, a gas mixture is fed to the first gas separation module in the series, and the retentate gas withdrawn from the first gas separation module in the series forms the gas mixture introduced into the second gas separation module in the series. Where two gas separation modules are arranged in parallel, a gas mixture is divided into two portions with one portion being introduced into one of the gas separation modules and the other portion being introduced into the other of the gas separation modules, and with the retentate gases from the two gas separation modules being combined (unless there are also one or more further gas separation modules arranged in series with one or both of the gas separation modules arranged in parallel).

As used herein, the term "first gas separation module in the series", when used in relation to a membrane stage comprising a plurality of gas separation modules arranged in series, means the initial gas separation module that receives the initial gas mixture stream that is to be separated by said series of gas separation modules and that is therefore most upstream with respect to the retentate stream produced by said series of gas separation modules. Likewise, the term "last gas separation module in the series", when used in relation to a membrane stage comprising a plurality of gas separation modules arranged in series, means the final gas separation module from which the retentate gases are withdrawn that form the retentate stream produced by said series of gas separation modules, said gas separation module being therefore the most downstream with respect to said retentate stream.

In order to generate driving force for permeating gas across the gas separation membrane of a membrane stage or gas separation module, a pressure differential is generated between the feed and permeate sides of the membrane stage or gas separation module. Said pressure differential may be generated by providing a vacuum on the permeate side of the membrane stage or gas separation module and/or by elevating the pressure on the feed side of the membrane stage or gas separation module, using one or more vacuum pumps and/or compressors.

As used herein, the term "sweep gas" refers to a stream of gas that is introduced into a membrane stage or gas separation module on the permeate side of a membrane stage or gas separation module (i.e. it is not introduced into the feed side in order to permeate across the gas separation membrane but is instead supplied directly to the permeate side to mix with the permeate gases) in order to reduce the concentration on the permeate side of the more permeable component(s) of the gas mixture fed to said membrane stage or gas separation module, thereby reducing the partial pressure of said components on the permeate side of said membrane stage or gas separation module. This further helps drive the permeation of said components across the gas separation membrane of said membrane stage or gas separation module. Where a sweep gas is used in a gas separation module it will be introduced into the housing interior of the gas separation module on the permeate side via a sweep gas inlet to the housing.

As used herein, the term "product stream" refers to a stream produced by and withdrawn from one of the membrane stages of the membrane-based gas separation method or system that is not introduced into or processed in any further membrane stages of the method or system (and that, by definition, is therefore also not recycled back into the feed stream). Depending on its composition a product stream may, for example, constitute a commercially desired product intended and suitable for sale or use in another downstream process, or a waste stream suitable for rejection from the method and system. For example, where the membrane-based gas separation method or system is for separating a feed stream, comprising methane and carbon dioxide, into a methane product stream and/or a carbon dioxide product stream, the methane product stream may be a methane stream meeting product specifications for distribution via gas pipeline networks (such as a stream comprising at least 95 vol %, or at least 97 vol %, or at least 98 vol %, or 99 vol % or more methane); and/or the carbon dioxide product stream may be a carbon dioxide stream suitable for venting, carbon sequestration, or use in other chemical or industrial processes.

As used herein, the term "biogas feed stream" refers to a stream of gas comprising predominantly methane ($CH_4$) and carbon dioxide ($CO_2$) that is produced by the breakdown of organic matter. It may for example be produced from raw materials such as agricultural waste, manure, municipal waste, plant material, sewage, green waste, wastewater, and food waste, and may for example be produced by anaerobic digestion with anaerobic organisms or methanogens inside an anaerobic digester, biodigester or a bioreactor. Particular examples include biogas generated from anaerobic digester lagoons or from landfill sites. Although composed predominantly of methane and carbon dioxide, it may also contain small amounts of other components, such as for example hydrogen sulfide ($H_2S$), moisture ($H_2O$), nitrogen ($N_2$) and/or oxygen ($O_2$). Typically, a biogas feed stream will comprise at least 40 vol %, or at least 50 vol %, or between 50 and 80 vol %, or most usually between 55 and 70 vol % methane. Typically, a biogas feed stream will comprise at least 15 vol %, or between 15 and 60 vol %, or between 15 and 50 vol %, or most usually between 30 and 45 vol % carbon dioxide.

As used herein, the term "biomethane" refers to a methane stream produced by removing carbon dioxide from biogas in order to increase the concentration of methane so as to be comparable to the concentration present in natural gas, thereby meeting the product specifications for distribution via gas pipeline networks. Typically, a biomethane product stream will comprise at least 95 vol %, or at least 97 vol %, or at least 98 vol %, or 99 vol % or more methane.

Solely by way of example, an exemplary embodiment of the invention will now be described with reference to FIG. 1, which shows a membrane-based gas separation method and system in accordance with one embodiment of the present invention.

As shown in FIG. 1, the method and system uses four membrane stages (5, 8, 12, 15) arranged in fluid flow communication in order to separate a feed stream (1), comprising a first component and a second component, into a product stream of the first component (9) and a product stream of the second component (14, 21). Preferably, the first component is methane ($CH_4$) and the second component is carbon dioxide ($CO_2$), such that the feed stream comprises methane and carbon dioxide. The feed stream may for example be a raw biogas stream produced from mostly anaerobic fermentation of a biomass material such as agricultural waste, manure, municipal waste, plant material, sewage, green waste or food waste, although any feed stream that primarily comprises methane and carbon dioxide may be used.

The feed stream (1) is combined with a recycle stream (22) to form a combined feed stream (2) that is compressed in a compressor (3) to form a compressed feed stream (4). The compressor may comprise a single compression stage or a plurality of compression stages arranged in series and/or parallel, and may include one or more intercoolers and/or aftercoolers (not shown). The compressed feed stream may be treated to remove contaminants using equipment such as water separator vessels, chillers, filters, heat exchangers, adsorbent beds, etc.

The compressed feed stream (4) is introduced into a first membrane stage (5) comprising a first gas separation membrane that is more permeable to the second component than the first component, the first gas separation membrane separating the compressed feed stream (4) to form a first retentate stream (6) that is withdrawn from the feed side of the first membrane stage and a first permeate stream (7) that is withdrawn from the permeate side the first membrane stage, the first retentate stream (6) being enriched in the first component and the first permeate stream (7) being enriched in the second component. The first membrane stage (5) may comprise a single gas separation module or a plurality of gas separation modules. Where the first membrane stage (5) comprises a plurality of gas separation modules, these may be arranged in series and/or in parallel. The gas separation membrane present in said gas separation module(s) may take the form of one or more hollow fibers, flat sheets, spiral wound sheets, or have any other suitable configuration.

The first retentate stream is introduced into a second membrane stage (8) comprising a second gas separation membrane that is more permeable to the second component than the first component, the second gas separation membrane separating the first retentate stream (6) to form a second retentate stream (9) that is withdrawn from the feed side of the second membrane stage and a second permeate stream (10) that is withdrawn from the permeate side of the second membrane stage, the second retentate stream (9) being further enriched in the first component. The second membrane stage (8) may comprise a single gas separation module or a plurality of gas separation modules. Where the second membrane stage (8) comprises a plurality of gas separation modules, these may be arranged in series and/or in parallel. The gas separation membrane present in said gas separation module(s) may take the form of one or more hollow fibers, flat sheets, spiral wound sheets, or have any other suitable configuration.

The second retentate stream (9), which as noted above is further enriched in the first component, forms the product stream of the first component (9) that is withdrawn from the method and system. Where the first component is methane, the second retentate stream (9) will preferably be a stream comprising at least 95 vol %, or at least 97 vol %, or at least 98 vol %, or 99 vol % or more methane, such as for example a biomethane stream or other methane stream meeting the product specifications for distribution via gas pipeline networks.

In the embodiment illustrated in FIG. 1, the second retentate stream (9) exiting the second membrane stage (8) passes through a pressure control valve (11) that regulates the pressure of the second retentate stream (9) upstream of said valve, so as to maintain the pressures of the compressed feed stream (4), first retentate stream (6) and second retentate stream (9) upstream of said valve and the pressures on the feed sides of the first membrane stage and second membrane stage all at the same or approximately the same pressure.

The first permeate stream (7) is introduced into a third membrane stage (12) comprising a third gas separation membrane that is more permeable to the second component than the first component, the third gas separation membrane separating the first permeate stream (7) to form a third retentate stream (13) that is withdrawn from the feed side of the third membrane stage and a third permeate stream (14) that is withdrawn from the permeate side of the third membrane stage, the third permeate stream (14) being further enriched in the second component. The third membrane stage (12) may comprise a single gas separation module or a plurality of gas separation modules. Where the third membrane stage (12) comprises a plurality of gas separation modules, these may be arranged in series and/or in parallel. The gas separation membrane present in said gas separation module(s) may take the form of one or more hollow fibers, flat sheets, spiral wound sheets, or have any other suitable configuration.

The third permeate stream (14), which as noted above is further enriched in the second component, forms the product stream of the second component (14, 21) that is withdrawn from the method and system. Where the second component is carbon dioxide, the third permeate stream (14) will preferably be a $CO_2$ stream of high purity (e.g. 95 vol % or higher, or 98% or higher), which may be vented, sent for carbon sequestration or used in other chemical or industrial processes.

Optionally, the third permeate stream (14) may (as shown in FIG. 1) be withdrawn from the third membrane stage (12) at a sub-atmospheric pressure using a vacuum pump (20) that therefore maintains the pressure on the permeate side of the third membrane stage at said sub-atmospheric pressure. Alternatively, vacuum pump (20) may be absent and the third permeate stream (14) and the permeate side of the third membrane stage may, for example, be at atmospheric pressure.

The third retentate stream (13) is introduced into a fourth membrane stage (15) comprising a fourth gas separation membrane that is more permeable to the second component than the first component, the fourth gas separation membrane separating the third retentate stream (13) to form a fourth retentate stream (17) that is withdrawn from the feed side of the fourth membrane stage and fourth permeate stream (16) that is withdrawn from the permeate side of the fourth membrane stage. The fourth membrane stage (15) may comprise a single gas separation module or a plurality of gas separation modules. Where the fourth membrane stage (15) comprises a plurality of gas separation modules, these may be arranged in series and/or in parallel. The gas separation membrane present in said gas separation module (s) may take the form of one or more hollow fibers, flat sheets, spiral wound sheets, or have any other suitable configuration.

The fourth retentate stream (17) withdrawn from the fourth membrane stage is reduced in pressure to form a reduced pressure fourth retentate stream (19) that is then introduced into the second membrane stage (8) on the permeate side of the second membrane stage as a sweep gas (the second permeate stream (10) withdrawn from the permeate side of the second membrane stage being therefore formed of a mixture of said sweep gas and gases that have permeated the second gas separation membrane). Preferably, the reduced pressure fourth retentate stream (19) is at the same or approximately the same pressure as the pressure on the permeate side of the second membrane stage.

In the embodiment illustrated in FIG. 1, the fourth retentate stream (17) is reduced in pressure to form a reduced pressure fourth retentate stream (19) by passing the fourth retentate stream (17) through a pressure control valve (18) that regulates the pressure of fourth retentate stream (17) upstream of said valve, so as to maintain the pressures of the first permeate stream (7), third retentate stream (13) and fourth retentate stream (17) upstream of said valve and the pressures of the permeate side of the first membrane stage and feed sides of the third and fourth membrane stages all at the same or approximately the same pressure-said pressure being lower than that of the feed sides of the first and second membrane stages and higher than that of the permeate sides of the third and fourth membrane stages.

Finally, the second permeate stream (10) and the fourth permeate stream (16) are recycled into the feed stream. In the embodiment shown in FIG. 1, both the second permeate stream (10) and the fourth permeate stream (16) are at the same pressure as the feed stream (1) (for example, atmospheric pressure), with the second permeate stream (10) and the fourth permeate stream (16) first being combined to form a single recycle stream (22) that, as described above, is then combined with the feed stream (1) to form a combined feed stream (2) that is then compressed (before being introduced into the first membrane stage (5)).

However, in alternative embodiments (not shown), the second permeate stream (10) and the fourth permeate stream (16) could be recycled separately back into the feed stream. Equally, one or both of the second permeate stream (10) and the fourth permeate stream (16) could be at higher pressure (s) than that of the feed stream, with said stream(s) being then recycled into the feed stream between stages of the compressor (3). Furthermore, in circumstances where the feed stream (1) is available at a pressure suitable for use on the feed side of the first membrane stage (5) then compression of said stream prior to introduction of said stream into the first membrane stage (5) is no longer needed, in which case compressor (3) may be dispensed with and instead one or more separate compressors may be used for compressing the second permeate stream (10) and the fourth permeate stream (16) prior to said streams being recycled into the feed stream.

Suitable materials for forming the first, second, third and fourth gas separation membranes are well known in the art. For example, where the first component of the feed stream is methane ($CH_4$) and the second component of the feed stream is carbon dioxide ($CO_2$), various types of glassy polymeric materials are known that that are significantly more permeable to $CO_2$ than $CH_4$ and that are therefore suitable for forming said gas separation membranes. Where the feed stream is a stream (such as for example a biogas stream) that contains, in addition to methane ($CH_4$) and carbon dioxide ($CO_2$), also trace amounts of water vapor ($H_2O$), hydrogen sulfide ($H_2S$) and/or one or more other acid gases, it is preferable that the first, second, third and fourth gas separation membranes are also more permeable to these additional components of the feed stream (i.e. $H_2O$, $H_2S$ and/or other acid gases), and in this case various types of glassy polymeric materials are known that that are also significantly more permeable to these additional components than $CH_4$. Examples of polymer types that may be used for forming the first, second, third and fourth gas separation membranes include, but are not limited to, polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimide (such as Matrimid 5218 or P-84), polyamide, polyvinyl alcohol, polyvinyl acetate, polyethylene oxide, polydimethylsiloxane, copolymers, block copolymers, or polymer blends. The same polymer material(s) may be used for forming the gas separation membranes in each of the membrane stages and gas separation modules, or different polymer materials may be used for forming the membranes in one or more or all of the stages and modules.

EXAMPLE

A method of separating a methane- and carbon dioxide-containing feed stream into methane and carbon dioxide product streams using a membrane-based gas separation system as depicted in FIG. 1 was simulated, using Air Products and Chemicals Inc.'s built-in membrane process model in Aspen Technology, Inc.'s ASPEN Plus process simulation software, V10.

The feed stream (1) comprised 60 mol % $CH_4$ and 40 mol % $CO_2$ and had a flow rate of 1000 Nm3/hr. The inlet pressure and temperature of the first membrane stage (5) was set at 16 barg and 20° C. The optimum membrane areas for each of the membrane stages and the optimum pressures on the feed sides of the third and fourth membrane stage for producing a methane product stream (9) containing 1.5% $CO_2$ with methane recoveries of between 99 and 99.95% were calculated and then used in the simulation for production of said methane product stream with the specified levels of methane recovery. No vacuum pump (14) was used, except for one simulation of production of a methane product stream with a methane recovery of 99.5% where a vacuum pump (14) was used to generate a sub-atmospheric pressure on the permeate side of the third membrane stage (12) of −0.81 barg.

The results of said simulations are presented in the tables below. As can be seen, the membrane-based gas separation method system provided excellent performance.

| Raw Feed (Stream 1) | | | | | Recycle (Stream 22) | | |
| --- | --- | --- | --- | --- | --- | --- | --- |
| | | | Flow | Flow | | | |
| Case: CH4 Recovery | % CH4 mol % | % CO2 mol % | (dry) ncmh | (wet) ncmh | Flow ncmh | % CO2 mol % | Rcy:Feed ratio |
| 99.0 | 60.00 | 40.00 | 1000 | 1030 | 508 | 60.61 | 0.508 |
| 99.5 | 60.00 | 40.00 | 1000 | 1030 | 725 | 70.73 | 0.725 |
| 99.7 | 60.00 | 40.00 | 1000 | 1030 | 918 | 76.69 | 0.918 |
| 99.8 | 60.00 | 40.00 | 1000 | 1030 | 1172 | 81.05 | 1.172 |

13

-continued

Raw Feed (Stream 1)

| Case: CH4 Recovery | % CH4 mol % | % CO2 mol % | Flow (dry) ncmh | Flow (wet) ncmh | Recycle (Stream 22) Flow ncmh | % CO2 mol % | Rcy:Feed ratio |
|---|---|---|---|---|---|---|---|
| 99.9 | 60.00 | 40.00 | 1000 | 1030 | 1927 | 87.32 | 1.927 |
| 99.95 | 60.00 | 40.00 | 1000 | 1030 | 3350 | 91.87 | 3.350 |
| 99.5, Vac | 60.00 | 40.00 | 1000 | 1030 | 474 | 60.43 | 0.474 |

Relative Membrane Area

| Case: CH4 Recovery | Compressor (3) Discharge bar g | Comp. Est. Power kW | kW/ RawBG | Fraction of Total Area: Stg 1 | Fraction of Total Area: Stg 2 | Fraction of Total Area: Stg 3 | Fraction of Total Area: Stg 4 | Relative total Membrane Area |
|---|---|---|---|---|---|---|---|---|
| 99.0 | 16.0 | 225.2 | 0.2252 | 0.40 | 0.12 | 0.31 | 0.17 | 1.00 |
| 99.5 | 16.0 | 256.8 | 0.2568 | 0.34 | 0.22 | 0.32 | 0.11 | 0.76 |
| 99.7 | 16.0 | 284.8 | 0.2848 | 0.30 | 0.23 | 0.31 | 0.15 | 0.77 |
| 99.8 | 16.0 | 321.7 | 0.3218 | 0.29 | 0.25 | 0.29 | 0.17 | 0.78 |
| 99.9 | 16.0 | 432.0 | 0.4321 | 0.30 | 0.27 | 0.23 | 0.21 | 0.88 |
| 99.95 | 16.0 | 638.9 | 0.6391 | 0.29 | 0.34 | 0.17 | 0.20 | 0.94 |
| 99.5, Vac | 16.0 | 220.3 | 0.2204 | 0.34 | 0.14 | 0.27 | 0.25 | 0.88 |

Stg 1 Feed (Stream 4) — Stg 1 Ret (Stream 6)

| Case: CH4 Recovery | Flow ncmh | % CO2 mol % | % CH4 mol % | Temp ° C. | Pres bar g | Flow ncmh | % CO2 mol % | % CH4 mol % | Temp ° C. |
|---|---|---|---|---|---|---|---|---|---|
| 99.0 | 1508.34 | 46.91 | 53.03 | 20.00 | 16.00 | 939.51 | 23.24 | 76.75 | 20.00 |
| 99.5 | 1725.25 | 52.88 | 47.06 | 20.00 | 16.00 | 1177.87 | 34.94 | 65.05 | 20.00 |
| 99.7 | 1918.17 | 57.53 | 42.41 | 20.00 | 16.00 | 1296.17 | 40.12 | 59.87 | 20.00 |
| 99.8 | 2172.12 | 62.12 | 37.82 | 20.00 | 16.00 | 1462.43 | 46.04 | 53.94 | 20.00 |
| 99.9 | 2927.56 | 71.13 | 28.81 | 20.00 | 16.00 | 1881.61 | 56.75 | 43.24 | 20.00 |
| 99.95 | 4350.48 | 79.93 | 20.01 | 20.00 | 16.00 | 3048.61 | 72.10 | 27.87 | 20.00 |
| 99.5, Vac | 1474.93 | 46.54 | 53.40 | 20.00 | 16.00 | 911.48 | 20.48 | 79.52 | 20.00 |

Stg1 Perm (Stream 7) — Stg2 Perm (Stream 10) — Stg4 Perm (Stream 16)

| Case: CH4 Recovery | Flow ncmh | % CO2 mol % | Pres. bar g | Flow ncmh | % CO2 mol % | Pres. bar g | Flow ncmh | % CO2 mol % | Pres bar g |
|---|---|---|---|---|---|---|---|---|---|
| 99.0 | 568.82 | 86.01 | 3.62 | 380.36 | 55.44 | 0.30 | 127.33 | 76.02 | 0.30 |
| 99.5 | 547.38 | 91.50 | 3.76 | 603.34 | 67.21 | 0.30 | 121.30 | 88.21 | 0.30 |
| 99.7 | 622.00 | 93.81 | 3.55 | 710.82 | 72.06 | 0.30 | 206.64 | 92.61 | 0.30 |
| 99.8 | 709.69 | 95.25 | 3.60 | 872.31 | 76.24 | 0.30 | 299.02 | 95.08 | 0.30 |
| 99.9 | 1045.96 | 97.01 | 3.83 | 1290.86 | 82.11 | 0.30 | 635.89 | 97.90 | 0.30 |
| 99.95 | 1301.87 | 98.25 | 4.51 | 2449.56 | 89.37 | 0.30 | 899.97 | 98.69 | 0.30 |
| 99.5, Vac | 563.45 | 88.71 | 2.28 | 339.40 | 52.83 | 0.30 | 134.88 | 79.53 | 0.30 |

Stg3 Ret (Stm 13) — Stg4 Ret (Stm 17)

| Case: CH4 Recovery | Flow ncmh | % CO2 mol % | Pres bar g | Flow ncmh | % CO2 mol % | Pres bar g |
|---|---|---|---|---|---|---|
| 99.0 | 171.13 | 57.48 | 3.14 | 43.79 | 3.60 | 3.14 |
| 99.5 | 152.73 | 72.07 | 3.27 | 31.43 | 9.78 | 3.27 |
| 99.7 | 228.53 | 84.35 | 3.07 | 21.89 | 6.32 | 3.07 |
| 99.8 | 316.72 | 90.04 | 3.12 | 17.71 | 4.91 | 3.12 |

14

-continued

Stg3 Ret (Stm 13) — Stg4 Ret (Stm 17)

| Case: CH4 Recovery | Flow ncmh | % CO2 mol % | Pres bar g | Flow ncmh | % CO2 mol % | Pres bar g |
|---|---|---|---|---|---|---|
| 99.9 | 653.58 | 95.46 | 3.35 | 17.69 | 7.75 | 3.35 |
| 99.95 | 909.67 | 97.65 | 4.02 | 9.70 | 1.72 | 4.02 |
| 99.5, Vac | 168.90 | 64.62 | 2.28 | 34.02 | 5.54 | 2.28 |

Sales Gas (Stream 9) — Vent (Stream 14)

| Case: CH4 Recovery | Flow ncmh | % CH4 mol % | % CO2 mol % | CH4 Rec % | % CH4 mol % | Flow ncmh | Press bar g |
|---|---|---|---|---|---|---|---|
| 99.0 | 602.9 | 98.50 | 1.50 | 99.00 | 1.51 | 397.7 | 0.30 |
| 99.5 | 606.0 | 98.50 | 1.50 | 99.50 | 0.76 | 394.6 | 0.30 |

-continued

| Sales Gas (Stream 9) | | | | CH4 | Vent (Stream 14) | | |
|---|---|---|---|---|---|---|---|
| Case: CH4 Recovery | Flow ncmh | % CH4 mol % | % CO2 mol % | Rec % | % CH4 mol % | Flow ncmh | Press bar g |
| 99.7 | 607.2 | 98.49 | 1.51 | 99.70 | 0.46 | 393.5 | 0.30 |
| 99.8 | 607.8 | 98.50 | 1.50 | 99.80 | 0.31 | 393.0 | 0.30 |
| 99.9 | 608.4 | 98.50 | 1.50 | 99.90 | 0.15 | 392.4 | 0.30 |
| 99.95 | 608.7 | 98.49 | 1.51 | 99.95 | 0.08 | 392.2 | 0.30 |
| 99.5, Vac | 606.1 | 98.48 | 1.52 | 99.50 | 0.76 | 394.6 | −0.81 |

It will be appreciated that the present invention is not restricted to the details described above with reference to the preferred embodiments but that numerous modifications and variations can be made without departing from the spirit or scope of the invention as defined in the following claims.

The invention claimed is:

1. A membrane-based gas separation method, the method comprising:

(a) introducing a feed stream, comprising a first component and a second component, into a first membrane stage comprising a first gas separation membrane that is more permeable to the second component than the first component, the first gas separation membrane separating the feed stream to form a first retentate stream and a first permeate stream that are each withdrawn from the first membrane stage, the first retentate stream being enriched in the first component and the first permeate stream being enriched in the second component;

(b) introducing the first retentate stream into a second membrane stage comprising a second gas separation membrane that is more permeable to the second component than the first component, the second gas separation membrane separating the first retentate stream to form a second retentate stream and a second permeate stream that are each withdrawn from the second membrane stage, the second retentate stream being further enriched in the first component;

(c) introducing the first permeate stream into a third membrane stage comprising a third gas separation membrane that is more permeable to the second component than the first component, the third gas separation membrane separating the first permeate stream to form a third retentate stream and a third permeate stream that are each withdrawn from the third membrane stage, the third permeate stream being further enriched in the second component;

(d) introducing the third retentate stream into a fourth membrane stage comprising a fourth gas separation membrane that is more permeable to the second component than the first component, the fourth gas separation membrane separating the third retentate stream to form a fourth retentate stream and fourth permeate stream that are each withdrawn from the fourth membrane stage;

(e) introducing the fourth retentate stream as a sweep gas into the second membrane stage; and (f) recycling the second permeate stream and the fourth permeate stream into the feed stream.

2. The method of claim 1, wherein the first component is methane and the second component is carbon dioxide.

3. The method of claim 1, wherein the feed stream is a biogas feed stream.

4. The method of claim 1, wherein the second retentate stream forms a product stream comprising the first component.

5. The method of claim 1, wherein the third permeate stream forms a product stream comprising the second component.

6. The method of claim 1, wherein the fourth retentate stream is withdrawn from the fourth membrane stage at a first pressure and is introduced as sweep gas into the second membrane stage at a second pressure that is lower than the first pressure.

7. The method of claim 6, wherein the fourth retentate stream is reduced in pressure from the first pressure to the second pressure by passing the fourth retentate stream through a pressure control valve that maintains the fourth retentate stream at the first pressure upstream of the valve.

8. The method of claim 1, wherein the feed stream is compressed prior to being introduced into the first membrane stage.

9. The method of claim 8, wherein the second permeate stream is recycled into the feed stream upstream of the compressor or between stages of the compressor, and/or wherein the fourth permeate stream is recycled into the feed stream upstream of the compressor or between stages of the compressor.

10. The method of claim 1, wherein the third permeate stream is withdrawn from the third membrane stage at a sub-atmospheric pressure.

11. A membrane-based gas separation system, the system comprising:

a first membrane stage for receiving a feed stream comprising a first component and a second component, the first membrane stage comprising a first gas separation membrane that is more permeable to the second component than the first component and that is configured to separate the feed stream to form a first retentate stream and a first permeate stream that are each withdrawn from the first membrane stage with the first retentate stream being enriched in the first component and the first permeate stream being enriched in the second component;

a second membrane stage in fluid flow communication with the first membrane stage for receiving the first retentate stream from the first membrane stage, the second membrane stage comprising a second gas separation membrane that is more permeable to the second component than the first component and that is configured to separate the first retentate stream to form a second retentate stream and a second permeate stream that are each withdrawn from the second membrane stage with the second retentate stream being further enriched in the first component;

a third membrane stage in fluid flow communication with the first membrane stage for receiving the first permeate stream from the first membrane stage, the third membrane stage comprising a third gas separation membrane that is more permeable to the second component than the first component and that is configured to separate the first permeate stream to form a third retentate stream and a third permeate stream that are each withdrawn from the third membrane stage with the third permeate stream being further enriched in the second component;

a fourth membrane stage in fluid flow communication with the third membrane stage for receiving the third retentate stream from the third membrane stage, the fourth membrane stage comprising a fourth gas separation membrane that is more permeable to the second component than the first component and that is configured to separate the third retentate stream to form a fourth retentate stream and fourth permeate stream that are each withdrawn from the fourth membrane stage;

wherein the system is configured such that the fourth membrane stage is also in fluid flow communication with the second membrane stage such that the fourth retentate stream from the fourth membrane stage is introduced as a sweep gas into the second membrane stage; and wherein the system is configured such that the second permeate stream and the fourth permeate stream are recycled into the feed stream.

12. The system of claim 11, wherein the first component is methane and the second component is carbon dioxide.

13. The system of claim 11, wherein the feed stream is a biogas feed stream.

14. The system of claim 11, wherein the system is configured such that the second retentate stream is withdrawn from the system as a product stream comprising the first component.

15. The system of claim 11, wherein the system is configured such that the third permeate stream is withdrawn from the system as a product stream comprising the second component.

16. The system of claim 11, wherein the system is configured such that the fourth retentate stream is withdrawn from the fourth membrane stage at a first pressure and is introduced as sweep gas into the second membrane stage at a second pressure that is lower than the first pressure.

17. The system of claim 16, wherein the system further comprises a pressure control valve through which the fourth retentate stream is passed and reduced in pressure from the first pressure to the second pressure, the pressure control valve being configured to maintain the fourth retentate stream at the first pressure upstream of the valve.

18. The system of claim 11, wherein the system further comprises a compressor configured to compress the feed stream prior to said stream being introduced into the first membrane stage.

19. The system of claim 18, wherein the system is configured such that the second permeate stream is recycled into the feed stream upstream of the compressor or between stages of the compressor, and/or such that the fourth permeate stream is recycled into the feed stream upstream of the compressor or between stages of the compressor.

20. The system of claim 11, wherein the system further comprises a vacuum pump configured to withdraw the third permeate stream from the third membrane stage at a sub-atmospheric pressure.

* * * * *